United States Patent
Seligmann et al.

(10) Patent No.: US 9,572,095 B2
(45) Date of Patent: Feb. 14, 2017

(54) INTELLIGENT SELECTION OF MESSAGE DELIVERY MECHANISM

(75) Inventors: Doree Duncan Seligmann, New York, NY (US); Michael J. Sammon, Watchung, NJ (US); Lynne Shapiro Brotman, Westfield, NJ (US); Reinhard Peter Klemm, Basking Ridge, NJ (US); Ajita John, Middletown, NJ (US)

(73) Assignee: Avaya Inc., Basking Ridge, NJ (US)

( * ) Notice: Subject to any disclaimer, the term of this patent is extended or adjusted under 35 U.S.C. 154(b) by 3200 days.

(21) Appl. No.: 10/727,915

(22) Filed: Dec. 4, 2003

(65) Prior Publication Data
US 2004/0153518 A1 Aug. 5, 2004

Related U.S. Application Data

(63) Continuation-in-part of application No. PCT/US03/14041, filed on May 6, 2003.
(Continued)

(51) Int. Cl.
*G06F 15/16* (2006.01)
*H04W 48/18* (2009.01)
(Continued)

(52) U.S. Cl.
CPC .......... *H04W 48/18* (2013.01); *H04L 12/5692* (2013.01); *H04L 12/58* (2013.01);
(Continued)

(58) Field of Classification Search
CPC ..... H04W 48/18; H04W 8/20; H04L 12/5692; H04L 12/58; H04L 51/14; H04M 1/72572; H04M 1/72547
(Continued)

(56) References Cited

U.S. PATENT DOCUMENTS 5,481,590 A 1/1996 Grimes
5,493,692 A * 2/1996 Theimer .............. G06Q 10/107
340/5.74
(Continued)

FOREIGN PATENT DOCUMENTS

DE 4400207 A1 7/1994
EP 1008946 6/2000
(Continued)

OTHER PUBLICATIONS

Ali Milan, "Canadian Patent Application No. 2,488,428 Office Action", May 16, 2008, Published in: CA.
(Continued)

*Primary Examiner* — John Macilwinen
(74) *Attorney, Agent, or Firm* — Sheridan Ross P.C.

(57) ABSTRACT

A method and apparatus for selecting one of a plurality of delivery mechanisms for sending a message are disclosed. The illustrative embodiment enables the advantageous selection of the delivery mechanism for sending a message from a first telecommunications terminal to a second telecommunications terminal based on at least one of: (i) the location of the first terminal, (ii) the location of the second terminal, (iii) the time and date (i.e., the calendrical time) at the first terminal, (iv) the calendrical time at the second terminal, and (v) one or more properties of the message (e.g., the sending user, the receiving user, a message priority, the contents of the message, etc.). A delivery mechanism for sending a message comprises at least one of: a physical medium, a physical layer protocol, a medium access control, and a network for transport.

24 Claims, 5 Drawing Sheets

Related U.S. Application Data

(60) Provisional application No. 60/380,140, filed on May 6, 2002.

(51) Int. Cl.

| | | |
|---|---|---|
| *H04L 12/54* | (2013.01) | |
| *H04L 12/58* | (2006.01) | |
| *H04M 1/725* | (2006.01) | |
| *H04W 48/20* | (2009.01) | |
| *H04W 4/12* | (2009.01) | |
| *H04W 88/06* | (2009.01) | |

(52) U.S. Cl.
CPC .......... *H04L 12/5855* (2013.01); *H04L 51/14* (2013.01); *H04M 1/72547* (2013.01); *H04M 1/72566* (2013.01); *H04M 1/72572* (2013.01); *H04W 48/20* (2013.01); *H04L 12/5895* (2013.01); *H04W 4/12* (2013.01); *H04W 88/06* (2013.01)

(58) Field of Classification Search
USPC ......................................... 709/227, 206, 207
See application file for complete search history.

(56) References Cited

U.S. PATENT DOCUMENTS

| | | | |
|---|---|---|---|
| 5,790,974 A | 8/1998 | Tognazzini | |
| 5,938,721 A | 8/1999 | Dussell et al. | |
| 6,026,156 A | 2/2000 | Epler et al. | |
| 6,108,532 A | 8/2000 | Matsuda et al. | |
| 6,185,433 B1 | 2/2001 | Lele et al. | |
| 6,222,482 B1 | 4/2001 | Gueziec | |
| 6,356,533 B1 | 3/2002 | Bruno | |
| 6,408,063 B1 | 6/2002 | Slotte et al. | |
| 6,411,687 B1 | 6/2002 | Bohacek et al. | |
| 6,434,404 B1 | 8/2002 | Claxton | |
| 6,442,242 B1 | 8/2002 | McAllister et al. | |
| 6,522,884 B2 * | 2/2003 | Tennison et al. | ............ 455/445 |
| 6,529,737 B1 | 3/2003 | Skinner et al. | |
| 6,535,748 B1 | 3/2003 | Vuorio | |
| 6,542,584 B1 | 4/2003 | Sherwood et al. | |
| 6,650,653 B1 * | 11/2003 | Horng et al. | ................. 370/437 |
| 6,678,515 B1 | 1/2004 | Gillespie et al. | |
| 6,741,678 B2 | 5/2004 | Cannell et al. | |
| 6,760,581 B2 | 7/2004 | Dutta | |
| 6,763,089 B2 | 7/2004 | Feigenbaum | |
| 6,801,777 B2 * | 10/2004 | Rusch | ................. H04W 48/18 455/450 |
| 6,813,264 B2 * | 11/2004 | Vassilovski | ................. 370/352 |
| 6,816,577 B2 | 11/2004 | Logan | |
| 6,829,613 B1 * | 12/2004 | Liddy | ........................... 707/694 |
| 6,898,445 B2 | 5/2005 | Slettengren et al. | |
| 6,954,657 B2 | 10/2005 | Bork et al. | |
| 6,970,553 B1 | 11/2005 | Gao et al. | |
| 7,010,288 B2 | 3/2006 | Brown et al. | |
| 7,127,259 B2 | 10/2006 | Ueda et al. | |
| 7,130,644 B2 | 10/2006 | Kuwahra et al. | |
| 7,142,895 B2 | 11/2006 | Heatley, Jr. | |
| 7,149,300 B1 | 12/2006 | Khan et al. | |
| 7,180,991 B2 | 2/2007 | Dhara et al. | |
| 7,236,774 B2 | 6/2007 | Lee | |
| 2001/0006893 A1 | 7/2001 | Yoshioka | |
| 2001/0028709 A1 | 10/2001 | Makela et al. | |
| 2001/0031633 A1 | 10/2001 | Tuomela et al. | |
| 2002/0042262 A1 | 4/2002 | Aveling | |
| 2002/0059434 A1 | 5/2002 | Karaoguz et al. | |
| 2002/0086680 A1 | 7/2002 | Hunzinger | |
| 2002/0089421 A1 | 7/2002 | Farringdon et al. | |
| 2002/0098844 A1 | 7/2002 | Friedenfelds et al. | |
| 2002/0116641 A1 * | 8/2002 | Mastrianni | .................... 713/201 |
| 2003/0003901 A1 | 1/2003 | Kuroiwa | |
| 2003/0003922 A1 | 1/2003 | McClure | |
| 2003/0039339 A1 | 2/2003 | Luehrig et al. | |
| 2003/0054865 A1 | 3/2003 | Byers et al. | |
| 2003/0055912 A1 | 3/2003 | Martin, Jr. et al. | |
| 2003/0086411 A1 | 5/2003 | Vassilovski | |
| 2003/0095643 A1 | 5/2003 | Fortman et al. | |
| 2003/0112178 A1 | 6/2003 | Bajikar | |
| 2003/0112930 A1 | 6/2003 | Bosik et al. | |
| 2003/0119495 A1 * | 6/2003 | Hanninen | ............. H04W 40/02 455/422.1 |
| 2003/0134660 A1 | 7/2003 | Himmel et al. | |
| 2003/0144711 A1 * | 7/2003 | Pless et al. | ..................... 607/60 |
| 2003/0228002 A1 | 12/2003 | Tucker et al. | |
| 2004/0082317 A1 | 4/2004 | Graefen | |
| 2004/0086100 A1 | 5/2004 | Moore et al. | |
| 2004/0147814 A1 | 7/2004 | Zancho et al. | |
| 2004/0198427 A1 | 10/2004 | Kimbell et al. | |
| 2004/0203935 A1 | 10/2004 | Dowling et al. | |
| 2005/0048992 A1 | 3/2005 | Wu et al. | |
| 2005/0107130 A1 | 5/2005 | Peterson, II | |
| 2005/0254635 A1 | 11/2005 | Koretsky et al. | |
| 2006/0160530 A1 | 7/2006 | Tipley | |

FOREIGN PATENT DOCUMENTS

| | | |
|---|---|---|
| EP | 1 172 991 | 1/2002 |
| GB | 2303271 A | 2/1997 |
| JP | 04109961 A | 4/1992 |
| JP | 05111474 A | 5/1993 |
| JP | 06070898 A | 3/1994 |
| JP | 09113599 | 2/1997 |
| WO | WO 97/50231 | 12/1997 |
| WO | 0141457 A2 | 6/2001 |
| WO | WO/ 01/50788 A1 | 7/2001 |
| WO | WO 03/009622 A1 | 1/2003 |

OTHER PUBLICATIONS

Gkeli, Maria, "EP Application No. 03 254 175.7 Office Action", Feb. 19, 2009, Publisher: EPO, Published in: EP.

Mian, Ali, "CA Application No. 2,488,428 Office Action Jan. 27, 2011",, Publisher: CIPO, Published in: CA.

Sabharwal, Paul, "CA Application No. 2,454,966 Office Action Mar. 16, 2011",, Publisher: CIPO, Published in: CA.

S. Chhim, "CA Application No. 2,433,477 Office Action May 11, 2009",, Publisher: CIPO, Published in: CA.

Hashem, Lisa, "U.S. Appl. No. 10/262,798 Office Action Apr. 16, 2009",, Publisher: USPTO, Published in: US.

Anwah, Olisa, "U.S. Appl. No. 12/695,367 Notice of Allowance Dec. 21, 2010",, Publisher: USPTO, Published in: US.

Chhim, S., "CA Application No. 2,646,432 Office Action Jan. 17, 2011",, Publisher: CIPO, Published in: CA.

Chhim, S., "CA Application No. 2,646,496 Office Action Jan. 17, 2011",, Publisher: CIPO, Published in: CA.

Domingos, Luis, "EP Application No. 05012972.5 Office Action Mar. 5, 2010",, Publisher: EPO, Published in: EP.

Domingos, Luis, "EP Application No. 05012972.5 Office Action Apr. 23, 2009",, Publisher: EPO, Published in: EP.

Anwah, Olisa, "U.S. Appl. No. 10/262,798 Notice of Allowance Dec. 31, 2009",, Publisher: USPTO, Published in: US.

* cited by examiner

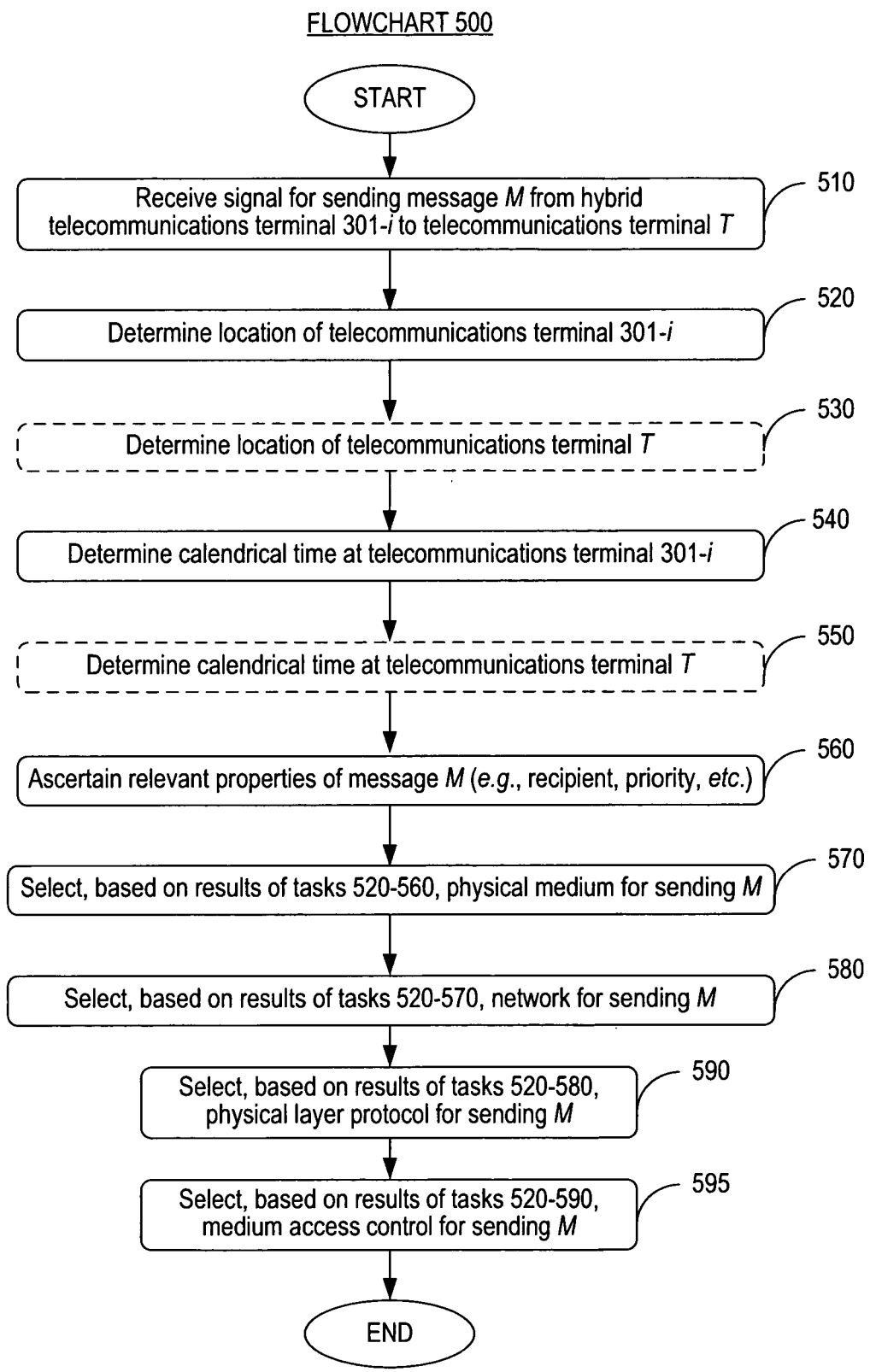

INTELLIGENT SELECTION OF MESSAGE DELIVERY MECHANISM

REFERENCE TO RELATED APPLICATIONS

This application is a continuation-in-part of:
i. PCT Patent Application PCT/US03/14041, filed on 6 May 2003, entitled "Intelligent Selection of Mode of Communication," now pending,
which is itself a continuation-in-part of:
ii. U.S. provisional patent application Ser. No. 60/380,140, filed on May 6, 2002, entitled "Method For Interception, Manipulations, and Usage of Bluetooth Voice Streams."
Both of these applications are incorporated by reference.

FIELD OF THE INVENTION

The present invention relates to telecommunications in general, and, more particularly, to intelligent selection of a delivery mechanism for sending a message from a telecommunications terminal.

BACKGROUND OF THE INVENTION

FIG. 1 depicts a schematic diagram of wireless local-area network 100 in the prior art, which comprises: stations 101-1 through 101-N, wherein N is a positive integer, and access point 102, interconnected as shown. Each station 101-i, wherein i is a positive integer in the set {1, . . . N}, communicates wirelessly with other stations in local-area network 100 via access point 102. Station 101-i must be located within a particular distance from access point 102 in order to communicate with access point 102 and other stations in wireless local-area network 100. A popular standard for wireless local-area networks is the Institute of Electrical and Electronics Engineers (IEEE) 802.11 specification.

FIG. 2 depicts a schematic diagram of two cellular handsets 201-1 and 201-2 that transmit and receive signals via cellular wireless network 200. As shown in FIG. 2, wireless network 200 comprises M wireless switching centers 210-1 through 210-M, where M is a positive integer, and wireless switching center 210-3 communicates with K base stations 220-3-1 through 220-3-K, where K is a positive integer. Each wireless switching center 210-i in wireless network 200 typically is connected to a plurality of base stations; however, for the purpose of clarity, base stations are shown only for wireless switching center 210-3 in FIG. 2.

A hybrid 802.11/cellular telecommunications terminal is a terminal that has both an IEEE 802.11 radio and a cellular radio (e.g., a Code Division Multiple Access radio, etc.), and therefore can send and receive signals either via an IEEE 802.11 local-area network or a cellular network.

SUMMARY OF THE INVENTION

The present invention enables the advantageous selection of a delivery mechanism for sending a message from a hybrid telecommunications terminal. For the purpose of this specification, a delivery mechanism comprises at least one of:
(i) a physical medium (e.g., copper, radio, etc.),
(ii) a physical layer protocol (e.g., Direct Sequence Spread Spectrum [DSSS], etc.),
(iii) a medium access control (e.g., Code Division Multiple Access [CDMA], etc.), and
(iv) a network for transport (e.g., Public Switched Telephone Network [PSTN], Internet, etc.).

Naturally, no selection is required for a particular category if only one choice is available (e.g., if radio is the only available physical medium, etc.).

In particular, the illustrative embodiment enables the automatic selection of a delivery mechanism for a message sent from a first terminal to a second terminal based on at least one of:
(i) the location of the first terminal,
(ii) the location of the second terminal,
(iii) the time and date (i.e., the calendrical time) at the first terminal,
(iv) the calendrical time at the second terminal, and
(v) one or more properties of the message (e.g., the sending user, the receiving user, a message priority, the contents of the message, etc.).

The following examples illustrate the desirability of automatic selection of a delivery mechanism based on (i) through (v) above.

Example for (i): At certain locations in a hospital, placing a telephone call via a cellular phone might have deleterious effects on nearby medical equipment, while placing a telephone call via an IEEE 802.11 station might not interfere with the medical equipment (for example, because the 802.11 radio operates at a different frequency). Conversely, in an 802.11 "hotspot" (i.e., an 802.11 local-area network in a public location) it might be more desirable to send an email message via a cellular network than via the hotspot, since encryption and security typically are more robust in cellular networks. Thus, it would be advantageous to have automatic selection of the most desirable delivery mechanism for sending a message from a hybrid telecommunications terminal, where "most desirable" is based on the location of the terminal in combination with particular preferences (e.g., user-defined rules, etc.).

Example for (ii): An administrator in building A of a hospital places a call with a hybrid 802.11/cellular phone to a nurse in building B of the hospital, who also has a hybrid 802.11/cellular phone. Building B contains sensitive medical equipment, while building A does not. It would be advantageous if the call to the nurse were automatically transmitted over the hospital campus 802.11 local-area network, rather than a cellular network, when the nurse is in building B. Conversely, when the nurse is in building A, it might be more desirable for the call to be transmitted over a cellular network for increased security (e.g., to comply with federal privacy laws when discussing a patient's records, etc.)

Example for (iii): An employee places a telephone call via a hybrid 802.11/cellular phone from his or her office. The corporate 802.11 local-area network is connected to the Internet via a voice-over-Internet-Protocol (VoIP) gateway. It might be advantageous for calls to be transmitted via 802.11 and the Internet rather than via a cellular network during business hours when cellular "air time" is more expensive than landline telephone charges. Conversely, for an employee that works the night-shift or weekend-shift, it might be advantageous for calls to be transmitted by a cellular network when the cellular service provider offers "free nights and weekends."

Example for (iv): In the example for (iii), if the employee is in New York and places a telephone call at 9:00 PM Eastern Standard Time to a person in San Francisco, it might be desirable to transmit the call over the 802.11 local-area network and Internet, rather than a cellular network, if the San Franciscan's cellular plan charges for incoming calls during peak periods (such as 6:00 PM Pacific Standard Time).

Examples for (v):

Bob, who works for a defense contractor, places a telephone call via a hybrid 802.11/cellular phone to Colonel Flag, the Army representative on the corporate premises. Since the call is directed to Colonel Flag, the call should be transmitted over a cellular network for greater security.

Bob sends a high-priority unclassified email message to a co-worker using a hybrid telecommunications terminal. Bob's cellular provider's email system is not very reliable, and thus the email message is automatically sent via the corporate 802.11 local-area network, since reliability, and not security, is the most important criterion for a high-priority unclassified message.

Colonel Flag has a hybrid telecommunications terminal that can communicate either via a military satellite-based network, or a civilian cellular network. The terminal supports both voice and data communications, and has an operating system that requires a user to log in with a password. Colonel Flag's wife, who is a civilian, also has an account on this terminal. When Colonel Flag sends a message from the terminal, the message is automatically transmitted either via the satellite network or the cellular network, depending on the terminal's location and/or the calendrical time, as described above. When Colonel Flag's wife logs into the terminal and sends a message, however, the message is always transmitted via the civilian cellular network.

Colonel Flag sends an email message from the hybrid satellite/cellular telecommunications terminal to Colonel Blake. Based on the text of the message, the message is automatically transmitted either via the cellular network (e.g., the email discusses yesterday's Army-Navy football game, etc.) or the satellite network (e.g., the email discusses a planned military operation, etc.).

For the purposes of this specification, the term "calendrical time" is defined as indicative of one or more of the following:

(i) a time (e.g., 16:23:58, etc.),
(ii) one or more temporal designations (e.g., Tuesday, November, etc.),
(iii) one or more events (e.g., Thanksgiving, John's birthday, etc.), and
(iv) a time span (e.g., 8:00-9:00, etc.).

The illustrative embodiment comprises: (a) determining the location of a first telecommunications terminal; and (b) selecting, based on the location, one of a plurality of physical media available to the first telecommunications terminal for sending a message to a second telecommunications terminal.

BRIEF DESCRIPTION OF THE DRAWINGS

FIG. 5 depicts a flowchart for selecting a physical medium, a physical layer protocol, a network, and a medium access control for sending a message from hybrid telecommunications terminal 301-i, as shown in FIG. 3, in accordance with the illustrative embodiment of the present invention.

DETAILED DESCRIPTION

Figure 3:
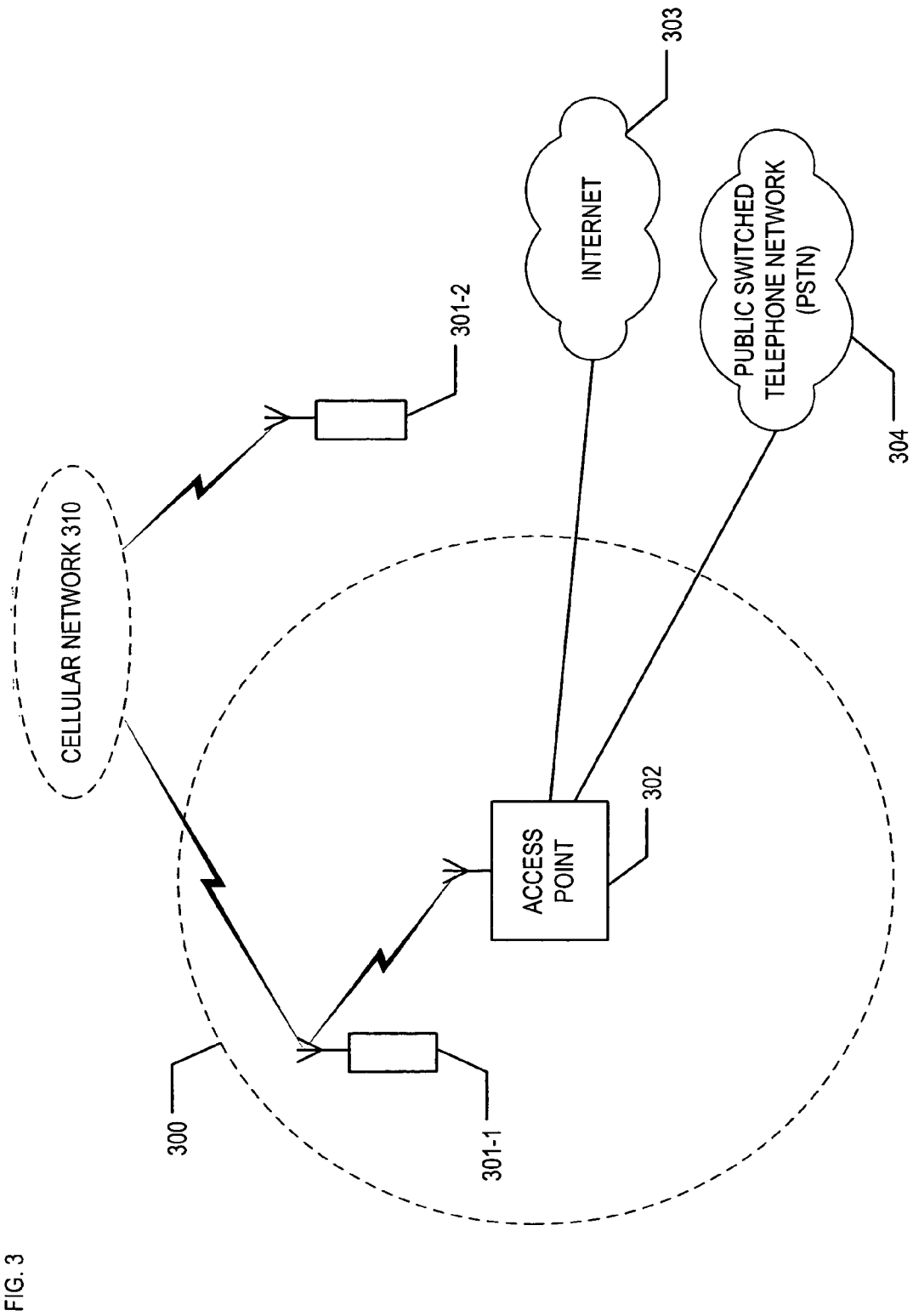
FIG. 3 depicts the operation of hybrid telecommunications terminals 301-1 and 301-2 in accordance with the illustrative embodiment of the present invention.

FIG. 3 depicts a schematic diagram of in accordance with the illustrative embodiment of the present invention. FIG. 3 depicts wireless local-area network 300 centered at access point 302, cellular network 310, hybrid telecommunications terminals 301-1 and 301-2, Internet 303, and Public Switched Telephone Network (PSTN) 304, interconnected as shown.

Figure 1:
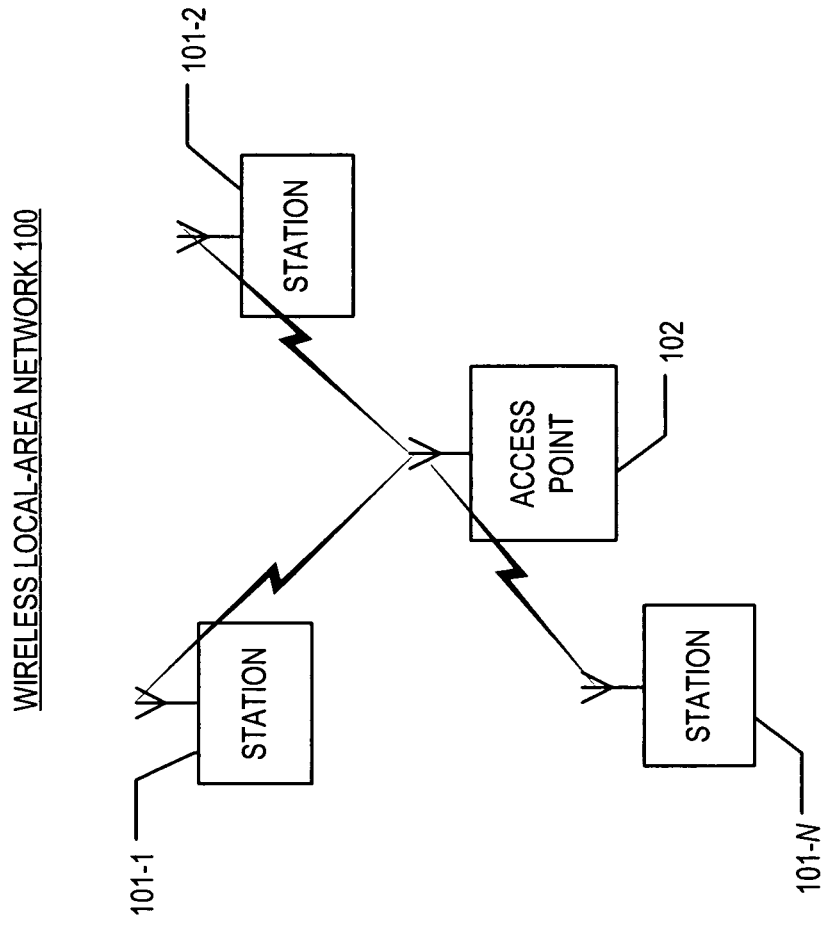
FIG. 1 depicts exemplary wireless local-area network 100 in the prior art.
Figure 2:
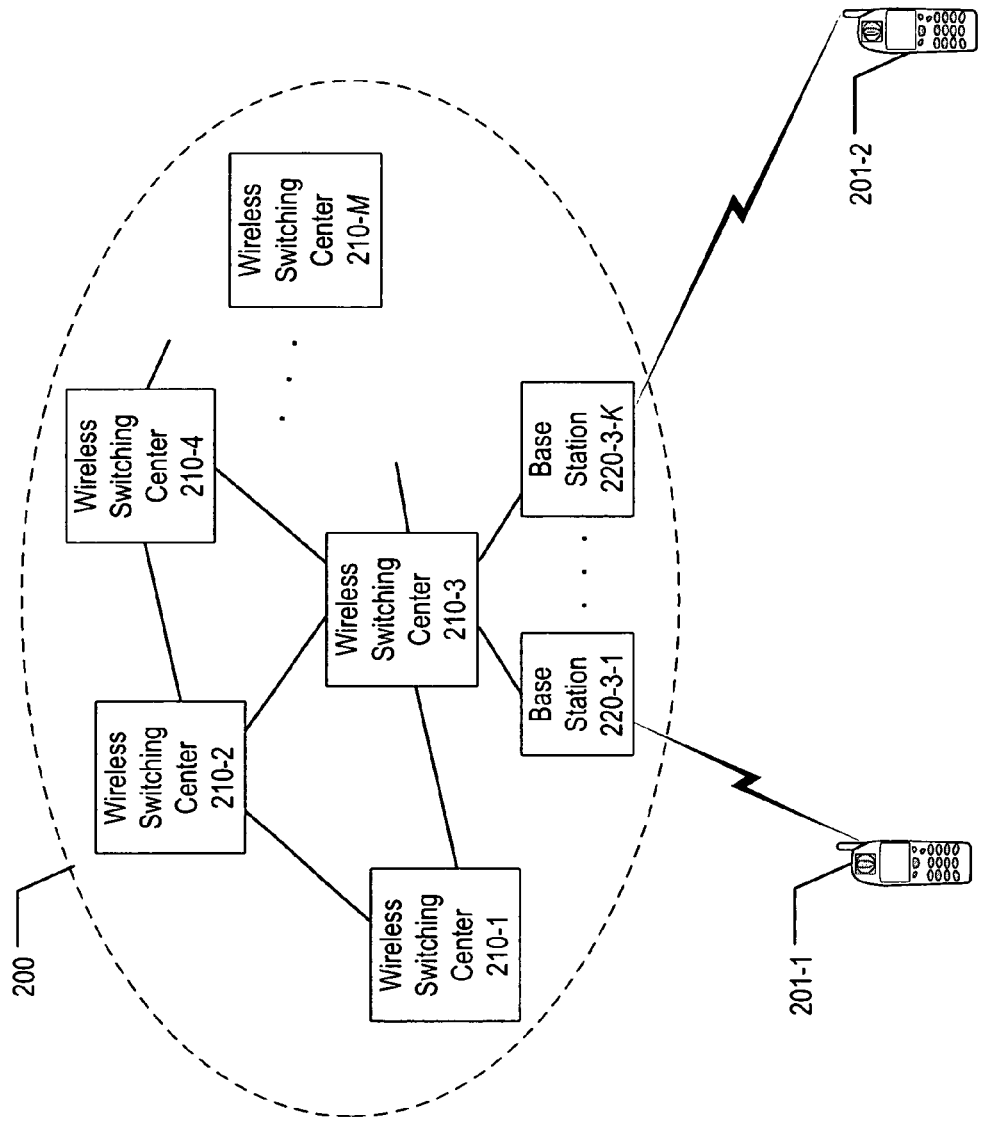
FIG. 2 depicts exemplary cellular network 200 and cellular handsets 201-1 and 201-2 in the prior art.

Cellular network 310 is identical to cellular network 200, as depicted in FIG. 2.

Access point 302 is identical to access point 202, as depicted in FIG. 2. As shown in FIG. 3, access point 302 is connected to Internet 303 and Public Switched Telephone Network (PSTN) 304, thereby enabling stations in local-area network 300 to send and receive signals via Internet 303 or Public Switched Telephone Network (PSTN) 304, in well-known fashion.

Hybrid telecommunications terminals 301-1 and 301-2 are 802.11/cellular telecommunications terminals. As shown in FIG. 3, both telecommunications terminals 301-1 and 301-2 are within transmission range of cellular network 310. Hybrid telecommunications terminal 301-1 is also within transmission range of access point 302, and thus has the capability of sending and receiving signals via local-area network 300 as well as cellular network 310. Hybrid telecommunications terminal 301-2, however, is outside transmission range of access point 302 and thus can send and receive signals only via cellular network 310.

As will be clear to those skilled in the art, FIG. 3 illustrates merely one embodiment in which a hybrid telecommunications terminal might be able to send messages via a plurality of delivery mechanisms in accordance with the present invention. In the example of FIG. 3, hybrid telecommunications terminal 301-1 can send messages via two different wireless networks (i.e., wireless local-area network 300 and cellular network 310.) In some other embodiments, hybrid telecommunications terminal 301-1 might be able to send messages (i) via three or more different networks; (ii) via two or more different physical media (e.g., copper, radio, etc.); (iii) via two or more different medium access controls (e.g., Code Division Multiple Access, Time Division Multiple Access, etc.); or (iv) via two or more different physical layer protocols (e.g., Direct Sequence Spread Spectrum, Orthogonal Frequency Division Multiplexing, etc.). It will be clear to those skilled in the art, after reading this specification, how to make and use embodiments of the present invention for such alternatives.

Figure 4:
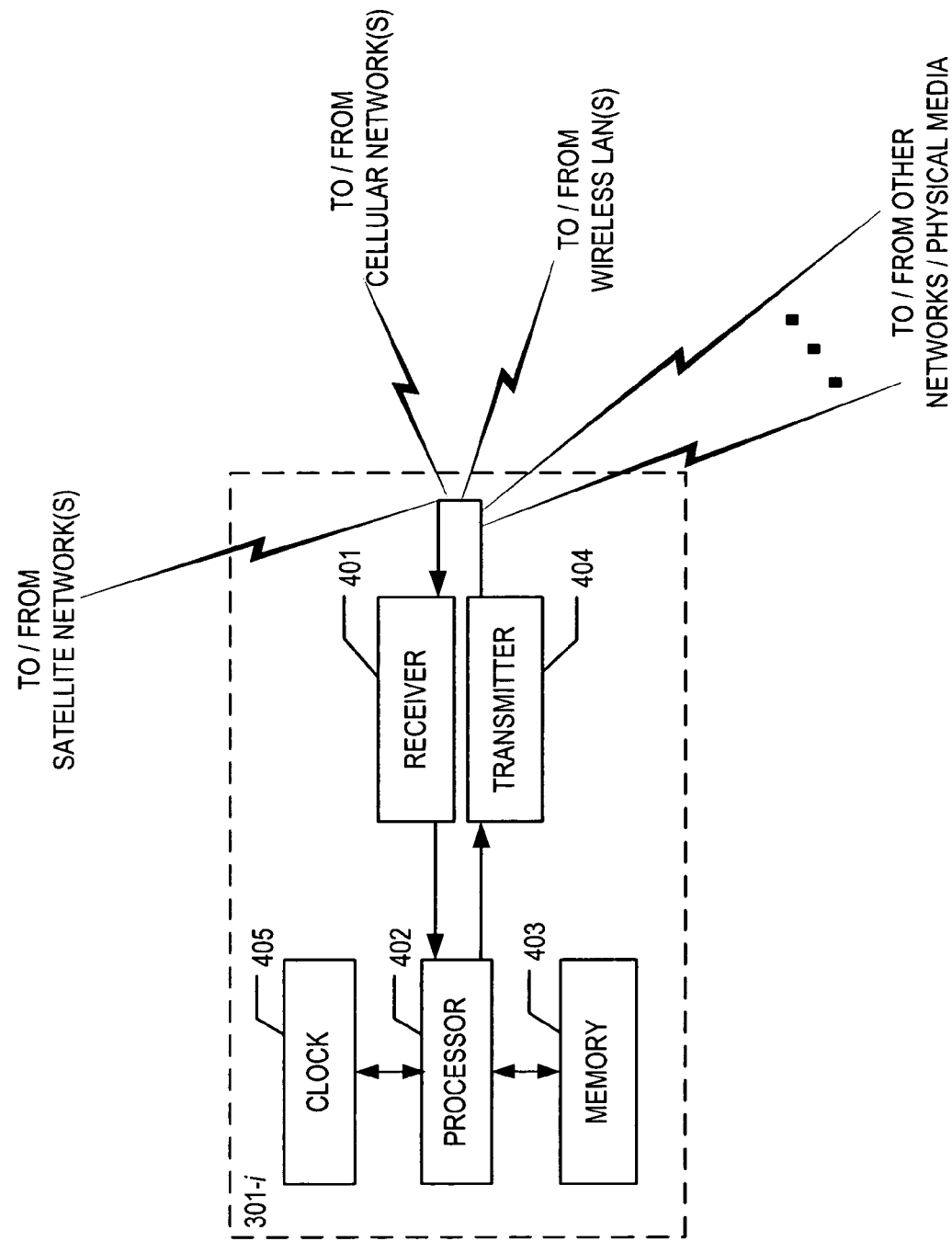
FIG. 4 depicts a block diagram of the salient components of hybrid telecommunications terminal 301-i, as shown in FIG. 3, in accordance with the illustrative embodiment of the present invention.

FIG. 4 depicts a block diagram of the salient components of hybrid telecommunications terminal 301-i in accordance with the illustrative embodiment of the present invention. Hybrid telecommunications terminal 301-i comprises receiver 401, processor 402, memory 403, transmitter 404, and clock 405, interconnected as shown.

As shown in FIG. 4, receiver 401 receives signals from a plurality of networks, including satellite-based, cellular, and wireless local-area networks. As will be appreciated by those skilled in the art, in some embodiments of the present invention receiver 401 might be a single physical receiver (e.g., a radio, etc.) for receiving signals from different networks, while in some other embodiments receiver 401 might be a composite receiver comprising a plurality of physical receivers (e.g., a radio and an Ethernet network interface card, two different radios, etc.).

Processor 402 is a general-purpose processor that is capable of executing instructions stored in memory 403, of reading data from and writing data into memory 403, of generating messages, and of executing the tasks described below and with respect to FIG. 5, described below. In some alternative embodiments of the present invention, processor 402 might comprise one or more special-purpose processors (e.g., a network processor, a dedicated processor for determining location from satellite signals, etc.). In either case, it will be clear to those skilled in the art, after reading this disclosure, how to make and use processor 402.

Memory 403 stores data and executable instructions, as is well-known in the art, and might be any combination of random-access memory (RAM), flash memory, disk drive, etc.

As shown in FIG. 4, transmitter 404 transmits signals to a plurality of networks, including satellite-based, cellular, and wireless local-area networks. As will be appreciated by those skilled in the art, in some embodiments of the present invention transmitter 404 might be a single physical transmitter (e.g., a radio transmitter, etc.) for transmitting signals via different networks, while in some other embodiments transmitter 404 might be a composite transmitter comprising a plurality of physical transmitters (e.g., a radio transmitter and an Ethernet network interface card, two different radio transmitters, etc.).

Clock 405 transmits the current date and time to processor 402 in well-known fashion.

FIG. 5 depicts flowchart 500 for selecting a physical medium, a physical layer protocol, a network, and a medium access control for sending a message from hybrid telecommunications terminal 301-$i$ in accordance with the illustrative embodiment of the present invention. As disclosed in the illustrative embodiment processor 402 of hybrid telecommunications terminal 301-$i$ executes the tasks of flowchart 500; however, it will be clear to those skilled in the art how to make and use alternative embodiments of the present invention in which another entity (e.g., an Internet server, an access point, a wireless switching center, etc.) performs some or all of the tasks of flowchart 500 (i.e., "infrastructure-based" embodiments).

At task 510, a signal to send a message M from hybrid telecommunications terminal 301-$i$ to some other telecommunications terminal T (not necessarily hybrid) is received in well-known fashion. In the illustrative embodiment, processor 402 receives this signal (e.g., from a user input device [not shown in FIG. 4], etc.), while in some other embodiments, another entity (e.g., an Internet server processor, an access point processor, etc.) might receive this signal.

At task 520, the location of hybrid telecommunications terminal 301-$i$ is determined. In the illustrative embodiment, satellite signals received by receiver 401 are forwarded to processor 402, and processor 402 performs the necessary computations to determine the location of hybrid telecommunications terminal 301-$i$. In some other embodiments, hybrid telecommunications terminal 301-$i$ might have a dedicated Global Positioning System (GPS) processor for determining location, as is well-known in the art, while in some other embodiments, another entity such as a wireless base station might determine the location of hybrid telecommunications terminal 301-$i$.

At optional task 530, the location of hybrid telecommunications terminal T is determined. (In some embodiments it might not be desirable to implement task 530 [e.g., it might require too many changes to legacy equipment, etc.] and thus this task is depicted as optional via dotted lines.) In the illustrative embodiment, hybrid telecommunications terminal 301-$i$ determines the location of hybrid telecommunications terminal T by sending a query to the appropriate access point, server, wireless base station, etc. In some other embodiments, an access point, server, etc. might perform task 530, possibly in addition to task 520, as described above. It will be clear to those skilled in the art how to implement task 530 in accordance with the illustrative embodiment, or in accordance with alternative embodiments such as infrastructure-based implementations.

At task 540, the calendrical time at hybrid telecommunications terminal 301-$i$ is determined. In the illustrative embodiment, processor 402 receives this information from clock 405. In some other embodiments, processor 402 might receive this information from receiver 401, which in turn receives this information from another entity (e.g., a wireless base station, etc.). In some other infrastructure-based embodiments, the wireless base station, access point, etc. that performs some or all of the tasks of flowchart 500 performs task 540 (e.g., via its own clock, etc.)

At optional task 550, the calendrical time at telecommunications terminal T is determined. In the illustrative embodiment, processor 402 determines the calendrical time at hybrid telecommunications terminal T mathematically based on the results of task 530 and 540 (i.e., by determining the number of time zones separating terminals 301-$i$ and T and accordingly adding or subtracting hours from the calendrical time determined at task 540.) In some other embodiments, an access point, server, etc. might perform task 550. It will be clear to those skilled in the art how to implement task 550 in accordance with the illustrative embodiment, or in accordance with alternative embodiments such as infrastructure-based implementations.

At task 560, one or more properties of message M (e.g., priority, semantic content, the sending user, the receiving user, etc.) are determined in well-known fashion. In the illustrative embodiment processor 402 performs task 560, while in some other embodiments an access point, server, etc. might perform task 560.

At task 570, a physical medium is selected from the set of physical media available to hybrid telecommunications terminal 301-$i$ for sending message M. (This set is based on transmitter 404's capabilities and terminal 301-$i$'s location). The selection is based on one or more of the location(s), calendrical time(s), and properties obtained in tasks 520 through 560, in accordance with one or more rules. In the illustrative embodiment task 570 is performed by processor 402, while in some other embodiments an access point, server, etc. might perform task 570. As will be appreciated by those skilled in the art, the rules for selecting a physical medium might be hard-coded (e.g., stored in a read-only portion of memory 403, etc.), or might be defined by the user of terminal 301-$i$ (e.g., via input means of terminal 301-$i$, etc.).

At task 580, a network is selected from the set of networks available to hybrid telecommunications terminal 301-$i$ for sending message M. (This set is based on the physical medium selected at task 570, transmitter 404's capabilities, and terminal 301-$i$'s location). The selection is based on one or more of the location(s), calendrical time(s), and properties obtained in tasks 520 through 560, in accordance with one or more rules. In the illustrative embodiment task 580 is performed by processor 402, while in some other embodiments an access point, server, etc. might perform task 580. As described above, in some embodiments the rules for selecting a network might be hard-coded (e.g., stored in a read-only portion of memory 403, etc.), or might be defined by the user of terminal 301-*i* (e.g., via input means of terminal 301-*i*, etc.).

At task 590, a physical layer protocol is selected from the set of physical layer protocol available to hybrid telecommunications terminal 301-*i* for sending message M. (This set is based on the network selected at task 580, transmitter 404's capabilities, and potentially terminal 301-*i*'s location). The selection is based on one or more of the location(s), calendrical time(s), and properties obtained in tasks 520 through 560, in accordance with one or more rules. In the illustrative embodiment task 590 is performed by processor 402, while in some other embodiments an access point, server, etc. might perform task 590. As described above, in some embodiments the rules for selecting a network might be hard-coded (e.g., stored in a read-only portion of memory 403, etc.), or might be defined by the user of terminal 301-*i* (e.g., via input means of terminal 301-*i*, etc.).

At task 595, a medium access control is selected from the set of medium access controls available to hybrid telecommunications terminal 301-*i* for sending message M. (This set is based on the network and physical layer protocols selected at tasks 580 and 590, respectively, and the capabilities of the software stored in memory 403.) The selection is based on one or more of the location(s), calendrical time(s), and properties obtained in tasks 520 through 560, in accordance with one or more rules. In the illustrative embodiment task 595 is performed by processor 402, while in some other embodiments an access point, server, etc. might perform task 595. As described above, in some embodiments the rules for selecting a network might be hard-coded (e.g., stored in a read-only portion of memory 403, etc.), or might be defined by the user of terminal 301-*i* (e.g., via input means of terminal 301-*i*, etc.).

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. A hybrid telecommunications terminal comprising:
   a receiver configured to receive signals from a plurality of networks, the plurality of networks comprising a cellular network and an IEEE 802.11 local-area network;
   a transmitter configured to transmit signals to each of the plurality of networks;
   a memory comprising instructions; and
   a processor, coupled to the receiver, transmitter, and memory, wherein the instructions program the processor to:
      determine a security level of a message to be transmitted from the hybrid telecommunications terminal to a second terminal, by analyzing a semantic content of the message;
      determine a location of the second terminal based on a signal received at the receiver in response to a query transmitted by the transmitter;
      select one of a plurality of different physical media for sending the message from the hybrid telecommunications terminal to the second terminal based on the location of the second terminal and at least one of a second location associated with the hybrid telecommunications terminal, a calendrical time at the hybrid telecommunications terminal, or an identity of a user of the hybrid telecommunications terminal, to yield a selected physical medium; and
      send the message from the hybrid telecommunications terminal via the transmitter to the second terminal via the selected physical medium and a corresponding one of the plurality of networks.

2. The terminal of claim 1, wherein the processor also selects the one of the plurality of different physical media based on the security level of the message, wherein each of the plurality of different physical media is associated with a respective degree of security, and wherein the processor selects the one of the plurality of different physical media also based on the respective degree of security.

3. The terminal of claim 1, wherein the processor selects the one of the plurality of different physical media also based on a user to whom the message is directed and a calendrical time at the second terminal.

4. A method comprising:
   determining, by a processor of a hybrid telecommunications terminal configured to send and receive signals via at least two different types of networks, a security level of a message to be transmitted from a transmitter of the hybrid telecommunications terminal to a receiver of a second terminal, by analyzing a semantic content of the message at the hybrid telecommunications terminal;
   determining, by the processor, a location of the second terminal based on a signal received at the receiver in response to a query transmitted by the transmitter;
   selecting, by the processor, one of a plurality of physical layer protocols for sending the message from the first terminal to the second terminal based on the location of the second terminal and at least one of a second location associated with the first terminal, a calendrical time at the first terminal, or an identity of a user of the first terminal, to yield a selected physical layer protocol; and
   sending, by the transmitter, the message to the receiver of the second terminal via the selected physical layer protocol and a corresponding one of the at least two different types of networks;
   wherein the at least two different types of networks comprise a cellular network and an IEEE 802.11 local-area network.

5. The method of claim 4, wherein the processor selecting the one of the plurality of physical layer protocols is also based on the security level of the message, wherein each of the plurality of physical layer protocols is associated with a respective degree of security, and wherein the processor selecting the one of the plurality of physical layer protocols is also based on the respective degree of security.

6. The method of claim 4, wherein the processor selecting the one of the plurality of physical layer protocols is also based on a plurality of a user to whom the message is directed, and a calendrical time at the second terminal.

7. A hybrid telecommunications terminal comprising:
   a receiver to receive signals from a plurality of networks, the plurality of networks comprising a cellular network and an IEEE 802.11 local-area network;

a transmitter to transmit signals to each of the plurality of networks;
a memory comprising instructions;
a processor, coupled to the receiver, transmitter, and memory, wherein the instructions program the processor to:
determine a characteristic of a location of the hybrid telecommunications terminal;
determine a location of a second telecommunications terminal based on a signal received at the receiver in response to a query transmitted by the transmitter;
determine an identity of a user of the hybrid telecommunications terminal;
determine a security level of a message by analyzing a semantic content of the message at the hybrid telecommunications terminal;
select one of a plurality of medium access controls for sending a message from the hybrid telecommunications terminal to the second telecommunications terminal based on one of the characteristic of the location, or the identity of the user of the hybrid telecommunications terminal, to yield a selected medium access control; and
send the message from the hybrid telecommunications terminal to the second telecommunications terminal via the selected medium access control and a corresponding one of the plurality of networks.

8. The terminal of claim 7, wherein the processor also selects the one of the plurality of medium access controls based on the security level of the message, wherein each of the plurality of medium access controls is associated with a respective degree of security, and wherein the processor selects the one of the plurality of medium access controls also based on the respective degree of security.

9. The terminal of claim 7, wherein the processor selects the one of the plurality of medium access controls also based on a plurality of a user to whom the message is directed, a calendrical time at the hybrid telecommunications terminal, and a calendrical time at the second telecommunications terminal.

10. A hybrid telecommunications terminal comprising:
a receiver to receive signals from a plurality of networks, the plurality of networks comprising a cellular network and an IEEE 802.11 local-area network;
a transmitter to transmit signals to each of the plurality of networks;
a memory comprising instructions;
a processor, coupled to the receiver, transmitter, and memory, wherein the instructions program the processor to:
determine a security level of a message to be transmitted from the hybrid telecommunications terminal to a second telecommunications terminal, by analyzing a semantic content of the message at the hybrid telecommunications terminal;
determine a location of the second telecommunications terminal based on a signal received at the receiver in response to a query transmitted by the transmitter;
select one of a plurality of networks for sending the message from the hybrid telecommunications terminal to the second telecommunications terminal based on the location of the second telecommunications terminal and at least one of a characteristic of a second location associated with the hybrid telecommunications terminal, or an identity of a user of the hybrid telecommunications terminal, to yield a selected network; and
send the message from the hybrid telecommunications terminal to the second telecommunications terminal via the selected network.

11. The terminal of claim 10, wherein the processor also selects the one of the plurality of networks based on the security level of the message, wherein each of the plurality of networks is associated with a respective degree of security, and wherein the processor selects the one of the plurality of networks also based on the respective degree of security.

12. The terminal of claim 10, wherein the processor selects the one of the plurality of networks also based on a plurality of a user to whom the message is directed, a calendrical time at the hybrid telecommunications terminal, and a calendrical time at the second telecommunications terminal.

13. A method comprising:
determining, by a processor of a hybrid telecommunications terminal configured to send and receive communications via at least two different types of networks, a characteristic of a location of the hybrid telecommunications terminal;
determining, by the processor, an identity of a user of the hybrid telecommunications terminal;
determining, by the processor, an identity of a human recipient of a message;
determining, by the processor, a location of a device associated with the human recipient based on a signal received at a receiver of the hybrid telecommunications terminal in response to a query transmitted by a transmitter of the hybrid telecommunications terminal;
selecting, by the processor, one of a plurality of different physical media for sending the message to the device based on the identity of the human recipient and at least one of the characteristic of the location, or the identity of the user, to yield a selected physical medium; and
sending, by the transmitter, the message from the hybrid telecommunications terminal to a receiver of the device via the selected physical medium and a corresponding one of the at least two different types of networks,
wherein the at least two different types of networks comprise a cellular network and an IEEE 802.11 local-area network.

14. The method of claim 13, where each of the plurality of different physical media is associated with a respective degree of security, and wherein the processor selecting the one of the plurality of different physical media is also based on the respective degree of security.

15. The method of claim 13, wherein the characteristic of the location is tolerance to signal interference and wherein the selection of one of a plurality of different physical media is also based on a plurality of a user to whom the message is directed, a calendrical time at the hybrid telecommunications terminal, and a calendrical time at the device.

16. A hybrid telecommunications terminal comprising:
a receiver to receive signals from a plurality of networks, the plurality of networks comprising a cellular network and an IEEE 802.11 local-area network;
a transmitter to transmit signals to the plurality of networks;
a memory comprising instructions;
a processor, coupled to the receiver, transmitter, and memory, wherein the instructions program the processor to:
determine a characteristic of a location of the hybrid telecommunications terminal;

determine an identity of a user of the hybrid telecommunications terminal;
determine an identity of a human recipient of a message;
determine a location of a device associated with the human recipient based on a signal received at the receiver in response to a query transmitted by the transmitter;
select one of a plurality of different physical layer protocols for sending the message by the processor to the device based on the identity of the human recipient and at least one of the characteristic of the location, or the identity of the user, to yield a selected physical layer protocol; and
send the message from the transmitter of the hybrid telecommunications terminal to the device via the selected physical layer protocol and a corresponding one of the plurality of networks.

17. The terminal of claim 16, wherein each of the plurality of different physical layer protocols is associated with a respective degree of security, and wherein the processor selects the one of the plurality of different physical media also based on the respective degree of security.

18. The terminal of claim 16, wherein the characteristic of the location is tolerance to signal interference and wherein the selection of one of the plurality of different physical layer protocols is also based on a calendrical time at the hybrid telecommunications terminal and a calendrical time at the device.

19. A method comprising:
determining, by a processor of a hybrid telecommunications terminal configured to send and receive signals via at least two different types of networks, a characteristic of a location of the hybrid telecommunications terminal;
determining, by the processor, an identity of a user of the hybrid telecommunications terminal;
determining, by the processor, an identity of a human recipient of a message;
determining, by the processor, a location of a device associated with the human recipient based on a signal received at a receiver of the hybrid telecommunications terminal in response to a query transmitted by a transmitter of the hybrid telecommunications terminal;
selecting, by the processor, one of a plurality of different medium access controls for sending the message to the device based on one of the characteristic of the location, the identity of the user, and the identity of the human recipient, to yield a selected medium access control; and
sending, by the processor, the message from the transmitter to a receiver of the device via the selected medium access control and a corresponding one of the at least two different types of networks;

wherein the at least two different types of networks comprise a cellular network and an IEEE 802.11 local-area network.

20. The method of claim 19, wherein each of the plurality of different medium access controls is associated with a respective degree of security, and wherein the processor selecting the one of the plurality of different medium access controls is also based on the respective degree of security.

21. The method of claim 19, wherein the characteristic of the location is tolerance to signal interference and wherein the selection of one of the plurality of different medium access controls is also based on a calendrical time at the hybrid telecommunications terminal and a calendrical time at the device.

22. A hybrid telecommunications terminal comprising:
a receiver to receive signals from a plurality of networks, the plurality of networks comprising a cellular network and an IEEE 802.11 local-area network;
a transmitter to transmit signals to the plurality of networks;
a memory comprising instructions;
a processor, coupled to the receiver, transmitter, and memory, wherein the instructions program the processor to:
determine a characteristic of a location of the hybrid telecommunications terminal;
determine an identity of a user of the hybrid telecommunications terminal;
determine an identity of a human recipient of a message;
determine, by the processor, a location of a device associated with the human recipient based on a signal received at the receiver in response to a query transmitted by the transmitter;
select one of a plurality of networks for sending the message to the device based on the identity of the human recipient and at least one of the characteristic of the location, or the identity of the user, to yield a selected network; and
send the message from the hybrid telecommunications terminal to the device via the selected network.

23. The terminal of claim 22, wherein each of the plurality of networks is associated with a respective degree of security, and wherein the processor selects the one of the plurality of networks also based on the respective degree of security.

24. The terminal of claim 22, wherein the characteristic of the location is tolerance to signal interference and wherein the selection of one of the plurality of networks is also based on a calendrical time at the hybrid telecommunications terminal and a calendrical time at the device.

* * * * *